US008909488B2

(12) United States Patent
Jaeger

(10) Patent No.: US 8,909,488 B2
(45) Date of Patent: *Dec. 9, 2014

(54) SYSTEMS AND METHODS FOR APPORTIONING USAGE OF A UTILITY IN A MULTI-UNIT BUILDING

(71) Applicant: HP Ventures A/S, Copenhagen N (DK)

(72) Inventor: Morten Gravild Bjerregaard Jaeger, Nakhon Si Thammarat (TH)

(73) Assignee: HP Ventures A/S, Copenhagen N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,503

(22) Filed: Mar. 18, 2013

(65) Prior Publication Data

US 2013/0211745 A1 Aug. 15, 2013

Related U.S. Application Data

(63) Continuation of application No. 12/943,483, filed on Nov. 10, 2010, now Pat. No. 8,428,891.

(51) Int. Cl.
| | | |
|---|---|---|
| *G01F 1/00* | (2006.01) | |
| *G01F 1/05* | (2006.01) | |
| *G01F 15/075* | (2006.01) | |
| *G01D 4/00* | (2006.01) | |
| *E03B 7/00* | (2006.01) | |
| *F24D 19/10* | (2006.01) | |

(52) U.S. Cl.
CPC .. *G01F 1/00* (2013.01); *G01F 1/05* (2013.01); *Y02B 90/245* (2013.01); *Y02B 90/246* (2013.01); *Y04S 20/42* (2013.01); *G01F 15/0755* (2013.01); *Y02B 90/241* (2013.01); *Y04S 20/32* (2013.01); *Y02B 70/3275* (2013.01); *E03B 7/00* (2013.01); *F24D 19/1063* (2013.01); *Y04S 20/244* (2013.01); *G01D 4/002* (2013.01); *Y04S 20/40* (2013.01)
USPC .......................................................... 702/48

(58) Field of Classification Search
CPC ....................................................... G01F 1/00

USPC ............................................................ 702/48
See application file for complete search history.

(56) References Cited

U.S. PATENT DOCUMENTS 5,838,258 A  11/1998  Saar
5,986,573 A  11/1999  Franklin et al.
(Continued)

FOREIGN PATENT DOCUMENTS

EP      1411329 A2    4/2004
EP      1843136 A2   10/2007

OTHER PUBLICATIONS

Kim, Y et al., "NAWMS: Nonintrusive Autnomous Water Monitoring System", Nov. 5, 2008, XP002672122, Retrieved from the Internet: URL: http://delivery.acm.org/10.1145/1470000/1460443/p309-kim.pdf?Ip-145.64.134.242&acc=ACTIVE%   20SERVICE&CFID=71792885&CFTOKEN=90784809&_acm_=1332430393_49c54ad17a8c9c09363e753a8b28fc1b [retrieved on Mar. 22, 2012] *the whole document*.

(Continued)

*Primary Examiner* — Bryan Bui
(74) *Attorney, Agent, or Firm* — Lewis, Rice & Fingersh, L.C.

(57) ABSTRACT

Usage of a utility in a multi-unit building is apportioned to a single unit by measuring the total usage of the utility using a meter unit to produce a total usage measurement, then positioning at least one sensor unit in a single unit of the multi-unit building and monitoring usage of the utility by the single unit using the at least one sensor unit to produce monitoring data. Then a processor unit receives the total usage measurement and the monitoring data and correlates them to generate correlated data. Finally, the processor unit apportions the total usage measurement to the single unit based on the correlated data.

19 Claims, 6 Drawing Sheets

(56) References Cited

U.S. PATENT DOCUMENTS

| | | |
|---|---|---|
| 6,161,100 A | 12/2000 | Saar |
| 6,377,190 B1 | 4/2002 | Saar |
| 7,360,413 B2 | 4/2008 | Jeffries et al. |
| 7,508,318 B2 | 3/2009 | Casella et al. |
| 8,428,891 B2 | 4/2013 | Jaeger |
| 8,606,413 B2 * | 12/2013 | Picton .......................... 700/282 |
| 2004/0073524 A1 | 4/2004 | Smith et al. |
| 2008/0262755 A1 | 10/2008 | Dayton et al. |
| 2009/0301167 A1 | 12/2009 | Priestman et al. |

OTHER PUBLICATIONS

Search report for European Patent Application No. 11173408.3, dated Apr. 12, 2012, 8 pages.

* cited by examiner

SYSTEMS AND METHODS FOR APPORTIONING USAGE OF A UTILITY IN A MULTI-UNIT BUILDING

This application in a Continuation of U.S. Utility patent application Ser. No. 12/943,483 filed Nov. 10, 2010, the entire disclosure of which is incorporated herein by reference.

BACKGROUND

1. Field of the Invention

Embodiments described herein relate to systems and methods for apportioning usage of a utility in a multi-unit building. More particularly, embodiments described herein relate to systems and methods for apportioning usage of a utility in a multi-unit building by monitoring usage in each unit and correlating the monitoring data with the total multi-unit building usage.

2. Description of Related Art

It is often inconvenient to individually meter utility usage in a multi-unit building such as an apartment building or a condominium. In many multi-unit buildings the main utility supply line is metered for the building as a whole. Usage is then arbitrarily apportioned to the units (e.g. by unit size or number of occupants) since individual metering is not provided for each unit. For example, in the case of water installations, it is typical for older buildings to employ vertical feed lines, with a single line supplying a plurality of vertically aligned water fixtures (e.g. sinks and toilets) across multiple units. In this case, each unit may have multiple pairs of supply lines feeding the various water fixtures in the unit, and each supply line may feed water fixtures in many units. Accordingly, it may be difficult and inconvenient to meter each unit individually.

SUMMARY

The embodiments described herein provide in one aspect, a method for apportioning usage of a utility in a multi-unit building. The method includes (a) measuring the total usage of the utility by the multi-unit building using a meter unit to produce a total usage measurement; (b) positioning at least one sensor unit in a single unit of the multi-unit building; (c) monitoring usage of the utility by the single unit using the at least one sensor unit to produce monitoring data; (d) receiving the total usage measurement and the monitoring data at a processor unit; (e) correlating the total usage measurement and the monitoring data using the processor unit to generate correlated data; and (f) apportioning the total usage measurement to the single unit using the processor unit based on the correlated data.

The embodiments described herein provide in another aspect a system for apportioning utility usage in a multi-unit building. The system includes (a) a meter unit mounted to a main feed pipe for measuring the usage of the utility by the multi-unit building to generate a total usage measurement, the main feed pipe supplying the utility to the multi-unit building; (b) at least one sensor unit positioned in a single unit of the multi-unit building for monitoring use of the utility by the single unit to generate monitoring data; and (c) a processor unit. The processor unit then receives the total usage measurement from the meter unit, receives the monitoring data from the at least one sensor unit, correlates the total usage measurement and the monitoring data to generate correlated data, and then apportions the total usage measurement to the single unit based on the correlated data.

Further aspects and advantages of the embodiments described herein will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
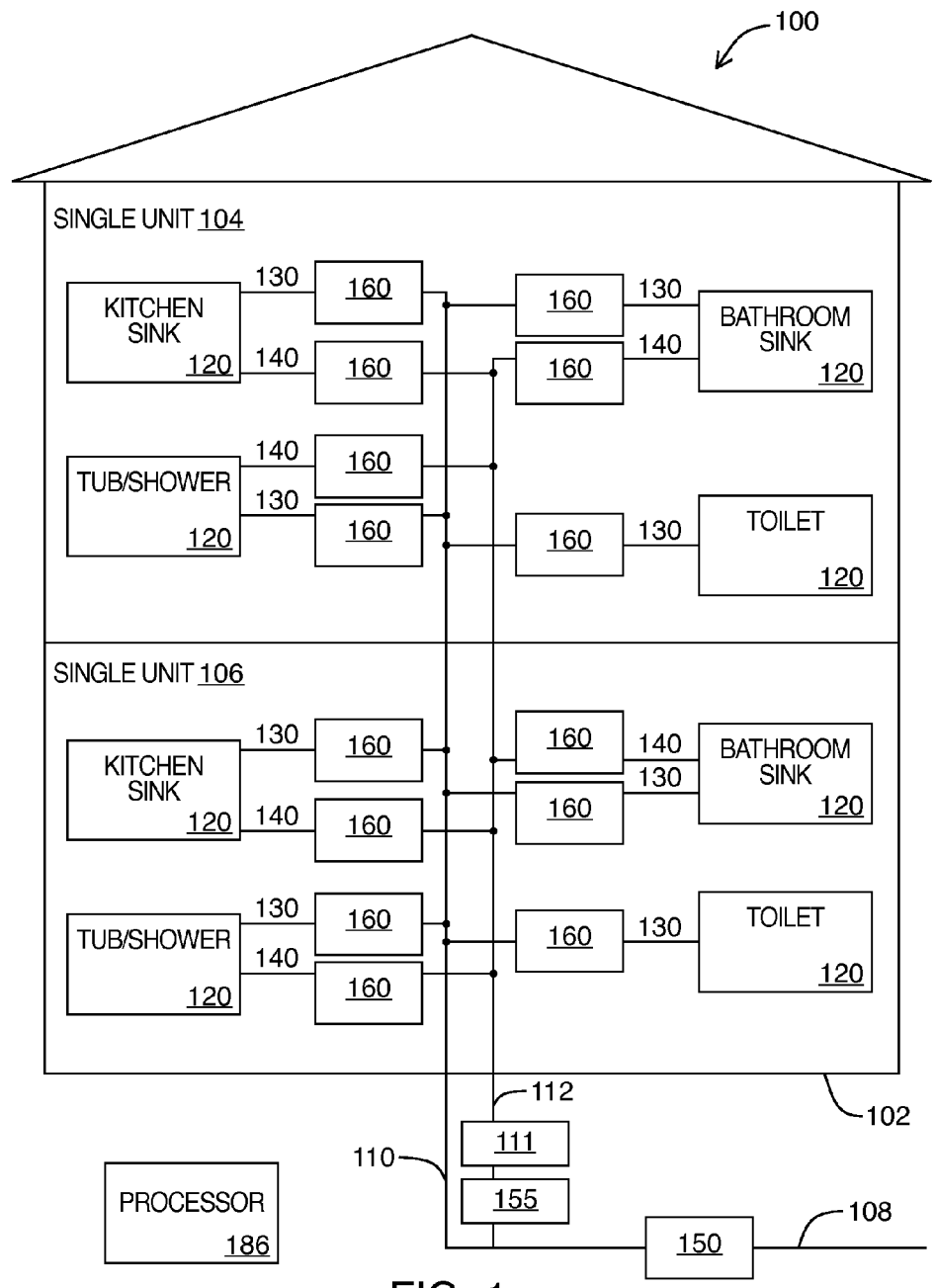
FIG. 1 is a schematic diagram of a system for apportioning water usage to single units of a multi-unit building.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way but rather as merely describing the implementation of the various embodiments described herein.

Embodiments described herein relate to systems and methods for apportioning usage of a utility in a multi-unit building wherein a sensor unit is installed on one or more unit feed pipes and the measurements taken by the sensors units are time correlated with the measurement taken on the main feed pipe to determine the usage attributable to each unit.

The system and methods will be described in relation to apportioning water usage; however, it will be evident to a person of skill in the art that the systems and methods described herein may be used to measure usage or flow of any fluid where applicable.

Reference is now made to FIG. 1, which illustrates a system 100 for apportioning water usage in a multi-unit building 102. The term "multi-unit building" will be used herein to describe any residential, commercial, or industrial building, such as an apartment building, a condominium, or an office building, having a plurality of units. It should be understood that while the multi-unit building 102 is only shown in FIG. 1 to have first and second single units 104, 106, the multi-unit building 102 may have any number of units.

In some embodiments, the system 100 may be used to apportion water usage in a single-unit building such as a house. In these embodiments, the system 100 may be used to determine water usage made by specific appliances (e.g. dish washers, washing machines etc.) and water-consuming fixtures (e.g. toilets, sinks). Further, the system 100 may be used to facilitate a pay-per-use system for such appliances and water-consuming fixtures, whereby the system 100 may determine the quantity of water used with each use of the appliance or water-consuming fixture.

Water is supplied to the multi-unit building 102 from the water supplier via a main feed pipe 108. The main feed pipe 108 supplies water to the multi-unit building's cold water feed pipe 110 and hot water feed pipe 112.

Water entering the multi-unit building 102 via the main feed pipe 108 is typically cold and requires heating before it enters the hot water feed pipe 112. It will be appreciated that water which supplies the hot water feed pipe 112 may be heated by any means known in the art. For example, in the embodiment of FIG. 1, water in the hot water feed pipe 112 is first heated by a hot water heater 111.

Each single unit 104, 106 of the multi-unit building 102 comprises one or more water outlets 120. A water outlet may be any fixture, appliance or otherwise that consumes water. For example, dishwashers, washing machines, sinks, showers, toilets and some refrigerators are water outlets in the sense that they consume water supplied by one or both of the cold and hot water feed pipes 110, 112. In the embodiment shown in FIG. 1, each single unit 104, 106 comprises four exemplary water outlets 120: a kitchen sink, a tub and/or shower, a toilet, and a bathroom sink.

It will be appreciated that there may be any number of cold and hot water feed pipes 110, 112 in a multi-unit building 102. For example, a multi-unit building 102 may have two pairs of cold and hot water feed pipes 110, 112 (second pair not shown). In this example, the first pair of cold and hot water feed pipes 110, 112 may extend vertically through the kitchens of a plurality of vertically aligned single units 104, 106. Also, the second pair of cold and hot water feed pipes (not shown) may extend vertically through bathrooms of a plurality of vertically aligned single units 104, 106.

Each of the water outlets 120 receives water from one or more cold and hot water unit feed pipes 130, 140. Cold water unit feed pipes 130 connect to and receive water from the cold water feed pipe 110, and the cold water unit feed pipes 130 supply cold water to a corresponding water outlet 120. Hot water unit feed pipes 140 connect to and receive water from the hot water feed pipe 112, and the hot water unit feed pipes 140 supply hot water to a corresponding water outlet 120. For example, in the embodiment shown in FIG. 1, each kitchen sink receives water from both a cold water unit feed pipe 130 and a hot water unit feed pipe 140, while each toilet only receives water from a cold water unit feed pipe 130.

A meter unit 150 attached to the main feed pipe 108 measures the quantity of water supplied to the multi-unit building 102 via the main feed pipe 108. The main feed pipe meter unit 150 may be one of a volumetric meter, a flow meter or any other type of measuring equipment suitable for measuring fluid consumption. The water supplier uses the readout provided by the main feed pipe meter unit 150 to calculate a utility bill for the owner of the multi-unit building 102.

In a typical water supply system, the main feed pipe meter unit 150 is the only device used by the water supplier to measure the usage of water by the multi-unit building 102. It is not possible to accurately determine the water consumption by each of the single units 104, 106 of the multi-unit building 102 by using only data from the main feed pipe meter unit 150.

To mitigate the shortcomings of a single meter in a multi-unit building, some buildings distribute utility costs amongst tenants according to one or more of their unit size and their number of occupants. This, however, may be seen as unfair by the tenants, and further does not provide a practical incentive for a unit's tenant to conserve utilities. For example, a tenant in a condominium building of 30 equal units would be responsible for 3% of the utility bill. Accordingly, all things being equal, if that tenant managed to conserve an additional $30 worth of a utility, their share of the utility bill would only drop $1. Apportioning the utility bill based on individual usage affords a greater incentive to conserve utility consumption.

To this end, a non-invasive sensor unit 160 may be installed on at least one unit feed pipe 130, 140 and/or on the water outlet 120. This way, the non-invasive sensor unit 160 can monitor for water flow through the at least one unit feed pipe 130, 140 and/or water outlet 120 on which it is installed. For example, in some embodiments, where pipes are hidden in a wall, it may be particularly convenient to spot-weld a non-invasive sensor unit 160 to the body of a water faucet instead of installing a non-invasive sensor unit 160 on a unit feed pipe 130, 140. That is, sensor unit 160 may be installed at least one unit feed pipe 130, 140 and water outlet 120; only on at least one unit feed pipe 130, 140; or only on the water outlet 120, depending on the type and number of measurements desired.

The term "non-invasive" is used herein to refer to non-invasive sensor units 160 that can be installed on a unit feed pipe 130, 140 or on a water outlet 120 without cutting or otherwise disrupting the unit feed pipe 130, 140 or water outlet 120. In contrast, the retrofitting of a multi-unit building with utility meters as typically used today requires cutting a pipe twice, threading the pipe, attaching the conventional sensor, and making sure that the joints are not leaking. This is an invasive, laborious and expensive operation that can be avoided using non-invasive sensor units 160.

It is not a requirement of the sensor units 160 to measure quantity of flow or volume, rather, the non-invasive sensor units 160 monitor the unit feed pipes 130, 140 or water outlet 120 to detect whether or not there is water flowing through them. For example, each non-invasive sensor unit 160 may at least monitor their respective unit feed pipe 130, 140 and/or water outlet 120 to detect the times at which water starts and stops flowing through their respective unit feed pipe 130, 140 and/or water outlet 120.

In some embodiments, the non-invasive sensor units 160 may measure a change of water flow through a water outlet 120. For example, the non-invasive sensor unit 160 may determine that the water flow through a water outlet 120 has changed by a positive or a negative rate, relative to a previous measurement.

It will be appreciated that the non-invasive sensor units 160 may monitor for any of a variety of indications of water flow. For example, a non-invasive sensor unit 160 may utilize an acoustic sensor such as a microphone to determine the start and stop times of fluid flow by using the acoustic sensor to detect changes in sound coming from the unit feed pipe 130, 140 and/or water outlet 120. In this example, the non-invasive sensor unit 160 may determine that water begins flowing through a unit feed pipe 130, 140 and/or water outlet 120 when it detects a minimum rise in sustained sound levels coming from the unit feed pipe 130, 140 and/or water outlet 120. Similarly, the non-invasive sensor unit 160 may determine that water has stopped flowing when it detects a minimum drop in sustained sound levels coming from the unit feed pipe 130, 140 and/or water outlet 120.

In another embodiment, the non-invasive sensor unit 160 utilizes an acoustic sensor and monitors for a relative amount of water flow. In this case, the non-invasive sensor unit 160 may determine the fraction of the water outlet's maximum consumption rate being consumed by monitoring the sound pressure and/or spectral distribution of the sound coming from the unit feed pipe 130, 140 and/or water outlet 120. The correlation between a water outlet's water consumption and the sound pressure and/or spectral distribution coming from the unit feed pipe 130, 140 and/or water outlet 120 may be calibrated for each water outlet 120.

In another example, a non-invasive sensor unit 160 may utilize a temperature sensor to determine the start and stop times by monitoring for changes in temperature of the unit feed pipe 130, 140 and/or water outlet 120. In this example, the non-invasive sensor unit 160 may determine that water is flowing through a cold water unit feed pipe 130 and/or water outlet 120 when it registers a minimum drop in temperature of the cold water unit feed pipe 130 and/or water outlet 120. Similarly, the non-invasive sensor unit 160 may determine that water has stopped flowing through a cold water unit feed pipe 130 and/or water outlet 120 when it registers a subsequent minimum rise in temperature of the cold water unit feed pipe 130 and/or water outlet 120.

In some embodiments, a water feed pipe meter unit 155 can be used to measure the consumption of water through one of the water feed pipes 110, 112. The water feed pipe meter unit 155 may be installed on, and measure the water consumption of, one of the hot water feed pipes 112 (as shown in FIG. 1) or the cold water feed pipe 110 (not shown). This may provide for more accurate apportioning of cold and hot water usage. Apportioning cold and hot water consumption separately may be significant where the cost to heat the water in the hot water feed pipe 112 makes hot water usage considerably more expensive than cold water usage.

Data collected by the non-invasive sensor units 160, the main feed pipe meter unit 150, and the water feed pipe meter unit 155 may be communicated by a wired or wireless network to a processor unit 186 for apportioning the utility consumption to the first and second single units 104, 106.

Figure 2:
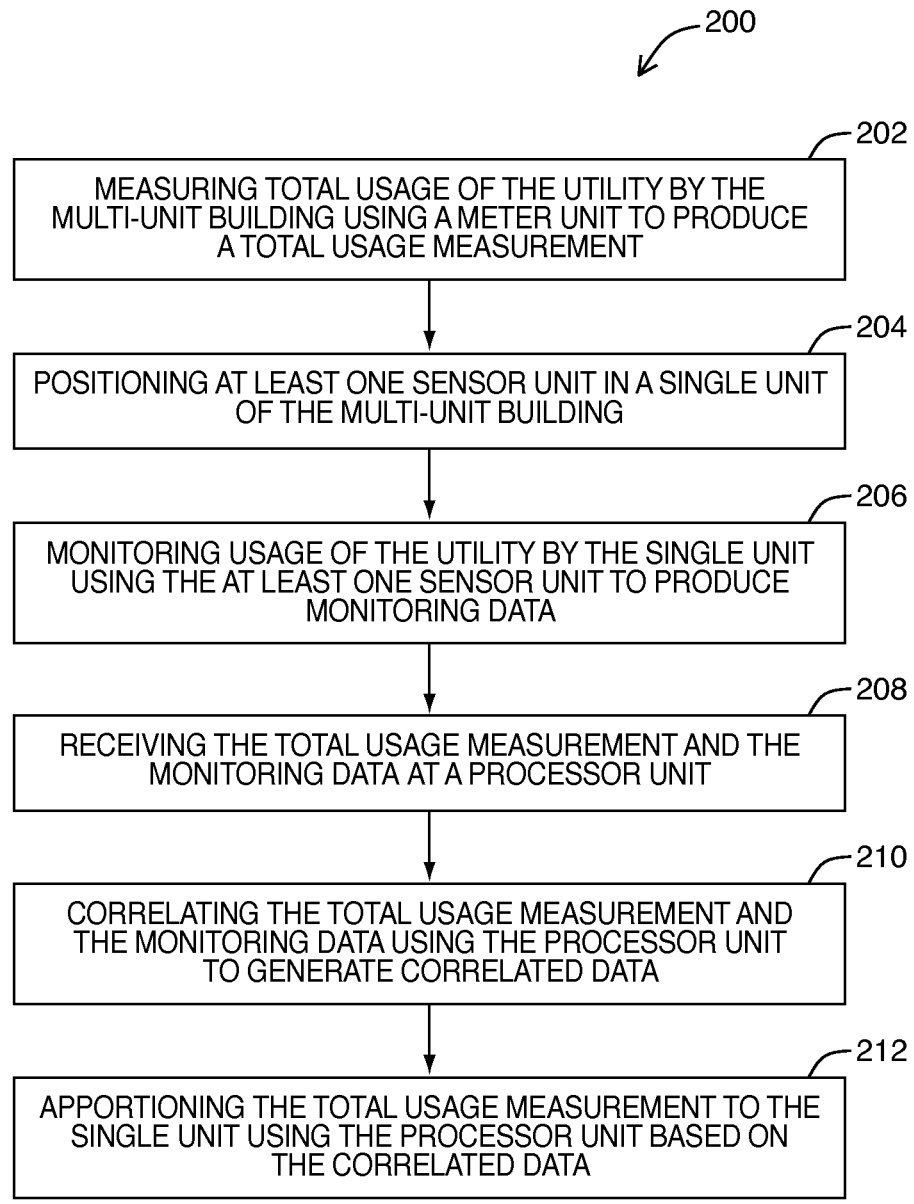
FIG. 2 is a flowchart of a method of apportioning water usage to single units of a multi-unit building using the system of FIG. 1 in accordance with at least one embodiment.

Reference is now made to FIG. 2 that illustrates a method 200 for apportioning water usage to the single units 104, 106 of the multi-unit building 102 using the system 100 of FIG. 1 in accordance with an embodiment of the present disclosure.

At step 202, the total water usage of the multi-unit building 102 is measured using the main feed pipe meter unit 150 to produce a building usage measurement and a total water usage measurement. The term "building usage measurement" refers to data reflecting the total amount of water that enters the building via the main feed pipe 108 as registered by the main feed pipe meter unit 150 over a period of time. In contrast, the term "total water usage measurement" refers to data reflecting the collective water usage to be apportioned to the single units 104, 106 of the multi-unit building 102 over a period of time.

In some embodiments, the difference between the building usage measurement and the total water usage measurement will be known as base water usage. Base water usage may be caused by leakage or by water flowing to a water outlet 120 that is not monitored by a non-invasive sensor unit 160. Base water usage may be constant or may vary over time. In certain embodiments where base water usage varies, base water usage can be approximated by measuring the base usage directly at the main meter 150 at times where no usage is registered in the single units 104, 106 and assuming that the base usage varies linearly between these measurements. The approximated base water usage may be used to calculate water consumption that should not to be attributed to the single units 104, 106. Subtracting the base water usage from the building usage measurement will produce the total water usage measurement that can then be apportioned to the single units 104, 106.

Alternatively, the building usage measurement may not be adjusted for base water usage and the total usage measurement may be equal to the building usage measurement (i.e. the total amount of water which enters the building via the main feed pipe 108 as registered by the main feed pipe meter unit 150).

In some variant embodiments, the building usage measurement may comprise a plurality of data points. Each data point may comprise a timestamp and a corresponding water measurement from the main feed pipe meter unit 150 (optionally adjusted for base water usage). The water measurement may be expressed in terms of cumulative volumetric water usage, instantaneous water flow rate or any other useful measurement. The water usage measurement may have sufficient temporal resolution to permit the measuring unit (e.g. volumetric water usage) to be converted with sufficient accuracy to another measuring unit (e.g. instantaneous water flow rate).

In some embodiments, the building usage measurement may comprise water measurements from both the main feed pipe meter unit 150 and the water feed pipe meter unit 155. In these embodiments, the building usage measurement may comprise data points that comprise a timestamp and a measurement from each of the main feed pipe meter unit 150 and the water feed pipe meter unit 155, each optionally adjusted for base water usage.

For example, where the water feed pipe meter unit 155 is installed on the hot water feed pipe 112, the hot water building usage measurement may be determined directly from the hot water feed pipe meter unit 155 and the cold water building usage measurement may be determined as the difference between the building usage measurement (from the main feed pipe meter unit 150) and the hot water building usage measurement. Once the cold and hot water building usage measurements are separately determined, they may be optionally adjusted for cold and hot base water usage to determine the cold and hot total water usage measurements that will be apportioned separately.

Alternatively, where the water feed meter unit 155 is not installed on the hot water feed pipe 122 and measurements for hot water are not available as a separate measurement, other means may be used to determine the amount of hot water consumed at a single utility point. The individual cold and hot water usage can be determined by registering the combined cold and hot water flow at a utility point by a non-invasive sensor unit 160 and further determining the relative amount of cold and hot water at the water outlet 120. The relative amount of cold and hot water at a water outlet 120 can be determined by a variety of means. For example, the relative amount of cold and hot water can be determined by positioning a non-invasive temperature sensor unit 160 at a point on the water outlet 120 where the temperature is influenced by both the cold and hot water.

In some embodiments it may suffice to approximately measure the relative amount of cold and hot water by making the assumption that the relative amount of hot and cold water flowing through the water outlet 120 is constant over one instance of usage, and then measuring the temperature of the mixture at multiple times, then using only one of said measurements, where the temperature is sufficiently stable over time. In variant embodiments, more advanced calculations may be performed on such measurements to gain better precision, using for example known or assumed diffusion profiles of the heat transfer for the water outlet 120 combined with the measured start and stop times of usage of water at the water outlet 120.

In another embodiment, the relative amount of cold and hot water will not be constant over time and measuring the temperature of the mixture at multiple times may be used as an approximation of the relative flow of cold and hot water over time. These measurements may again be subjected to more advanced calculations as described to better approximate the true relative amount of hot and cold water being consumed. In variant embodiments, the temperature of the cold and hot water before entering the water outlet 120 and being mixed may be measured to further facilitate calculations of the relative amount of cold and hot water being consumed.

In another embodiment the cold water temperature is assumed to be constant at the point where it is being supplied to the water outlet 120 by the unit feed pipe 130, and the hot water temperature is assumed to be constant at the point where it is being supplied to the water outlet 120 by the unit feed pipe 140.

The method that the above measurements are made, calculated, and interpreted, is largely a matter of what is considered to be "fair". For example, in one embodiment, a tenant opening a hot water tap on a faucet will pay the cold water price for the water when the water that comes out of the water outlet 120 is cold, and the hot water price when the water coming out of the water outlet 120 is hot. In certain embodiments, especially in older multi-unit buildings, it will take a different amount of time for hot water temperature to stabilize in different units. Once the total water usage measurement has been determined, the method 200 proceeds to step 204.

At step 204, at least one non-invasive sensor unit 160 is positioned in at least one single unit 104, 106 of the multi-unit building 102. As described above, typically one non-invasive sensor unit 160 is installed on each unit feed pipe 130, 140 and/or water outlet 120 of each single unit 104, 106. As previously discussed, sensor unit 160 may be installed on at least one unit feed pipes 130, 140 and/or water outlet 120; only on at least one unit feed pipes 130, 140; or only on the water outlet 120, depending on the type and number of measurements desired. Once the non-invasive sensor units 160 have been installed in the first and second single units 104, 106, the method 200 proceeds to step 206.

At step 206, the non-invasive sensor units 160 are used to monitor the usage of water by the single units 104, 106 and to produce monitoring data. In some embodiments each non-invasive sensor unit 160 monitors their respective unit feed pipe 130, 140 to detect the times at which water starts and stops flowing through their respective unit feed pipe 130, 140. In certain embodiments, the cold and hot water is mixed in the water outlet 120, and a combination of non-invasive sensor units 160 are employed to measure the start times of cold and hot water, and approximately measure the relative amount of cold and hot water being consumed. In certain embodiments, the non-invasive sensor units 160 additionally measure changes in the water flow, to allow for attribution of changes in consumption, in the event that more than one water outlet 120 is consuming water.

As described above, the non-invasive sensor units 160 may be configured to monitor for any of a variety of indications of water flow. It will also be appreciated that the non-invasive sensor units 160 may monitor for a plurality of indications (e.g. temperature and sound) to produce more accurate monitoring data (e.g. more accurate water flow start and stop times, or more accurately determine a change in flow through the water outlet 120). Once the monitoring data has been produced, the method 200 proceeds to step 208.

At step 208, the total usage measurement generated by the main feed pipe meter unit 150 (and the hot water feed pipe meter unit 155 if implemented) and the monitoring data generated by the non-invasive sensor units 160 are received at the processor unit 186. The total usage measurement and the monitoring data may be transmitted from the main feed pipe meter unit 150 (and the hot water feed pipe meter unit 155 if implemented) and the non-invasive sensor units 160 respectively via a wired or wireless network.

In one embodiment, the processor unit 186 is integrated with any one of the devices of the system. For example, in one embodiment the processor unit 186 is integrated with the main feed pipe meter unit 150. In at least one alternative embodiment the processor unit 186 is a remote processor unit and exists as a physically separate entity from the multi-unit building 102.

In one embodiment, the non-invasive sensor units 160 form a wireless mesh network. In this embodiment, the monitoring data can be relayed to the processor unit 186 via a series of non-invasive sensor units 160. For example, the non-invasive sensor units 160 may be able to receive monitoring data from neighboring non-invasive sensor units 160 and retransmit this data to the processor unit 186 or an intermediary non-invasive sensor unit 160 if the processor unit 186 is out of range. Once the total usage measurement and the monitoring data have been transmitted to the processor unit 186, the method 200 proceeds to step 210.

At step 210, the total usage measurement and the monitoring data are correlated using the processor unit 186 to generate correlated data. The total usage measurements of start and stop times are correlated with the measurements of flow or quantity to produce measurements of individual consumption. It will be appreciated that correlated data may take any form suitable for apportioning the utility usage to the first and second single units 104, 106. For example, where the monitoring data comprises start and stop times of water flow at each unit feed pipe 130, 140 and/or water outlet 120, the correlated data may comprise data of every start and stop time alongside the total usage measurement corresponding to those start and stop times. In this example, the total usage measurement for any given start or stop time may be read from the correlated data.

In a particular embodiment, the processor unit 186 is configured to present the data in various forms, including providing a display or user-interface (not shown) on the main feed pipe meter unit 150 for outputting the data. In a further embodiment, the data can be made available to the Internet via a GSM network for presentation in the form of a webpage.

Once the total usage measurement and the monitoring data are correlated using the processor unit 186, the method 200 proceeds to step 212.

At step 212, the total usage measurement is apportioned to the first and second single units 104, 106 using the processor unit 186 based on the correlated data. Apportioning the total usage measurement to the first and second single units 104, 106 assigns a volume of consumed water to each single unit 104, 106. An exemplary method for assigning usage to each single unit 104, 106 based on the correlated data is described in relation to FIG. 3. Once the total usage measurement has been apportioned, the first and second single units 104, 106 can be appropriately charged for the amount of water that they actually consumed.

Figure 3:
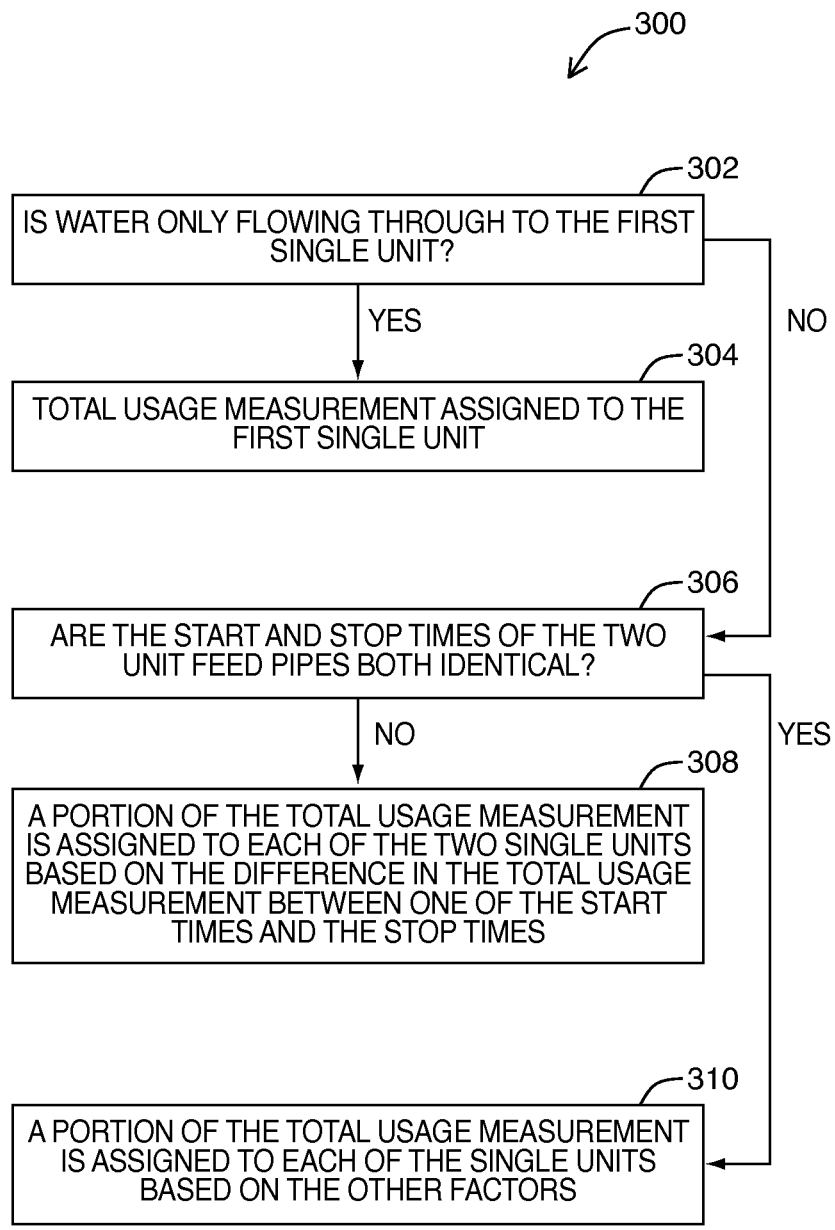
FIG. 3 is a flowchart of a method for assigning usage to each single unit based on the correlated data in accordance with at least one embodiment.

Reference is now made to FIG. 3, which illustrates an exemplary method 300 for assigning usage to the first and second single units 104, 106 of the multi-unit building 102 based on the correlated data in accordance with an embodiment of the present disclosure. The method 300 determines how much water consumption to assign to the first and second single units 104, 106 for a time period of interest. For the purposes of this example, the time period of interest is defined as the time between a pair of sequential start and stop times from a non-invasive sensor unit 160 which is installed on a unit feed pipe 130 in the first single unit 104. For clarity, this exemplary method assumes (i) that each single unit 104, 106 only has one unit feed pipe 130; (ii) that the monitoring data includes water flow start and stop times for each unit feed pipe 130, 140; and (iii) that the correlated data includes the start and stop times time correlated with the total usage measurement.

At step 302, it is determined whether water is only flowing through the unit feed pipe 130 of the first single unit 104, as opposed to both single units 104, 106, during the time period of interest. This can be determined, for example, by assessing whether any time periods between sequential start and stop times from the non-invasive sensor unit 160 of the second single unit 106 overlap with the time period of interest. If there is no such overlap, then water is only flowing through the unit feed pipe 130 of the first single unit 104 during the time period of interest. In that case, the method 300 proceeds to step 304. If on the other hand there is overlap, then water is flowing through the unit feed pipes 130 of both the first and second single units 104, 106 during the time period of interest, and the method 300 proceeds to step 306.

At step 304, if water is only flowing to the first single unit 104 during the time period of interest then all of the water consumed by the multi-unit building 102, (optionally adjusted for base water usage), during the time period of interest is attributed to the first single unit 104. Accordingly, the total usage measurement for the time period of interest is assigned to the first single unit 104.

At step 306, if water is flowing to both the first and second single units 104, 106 during the time period of interest then it is determined whether the water flow start and stop times of the two unit feed pipes 130 are both identical. If the start and stop times of the two unit feed pipes 130 are not both identical then the water is flowing through the two unit feed pipes 130 during overlapping but not identical time periods and the method 300 proceeds to step 308. If the start and stop times of the two unit feed pipes 130 are identical then the water is flowing through the two unit feed pipes 130 during the exact same period of time and the method 300 proceeds to step 310.

At step 308, the water flow start and stop times for the two unit feed pipes 130 are not both identical. Accordingly, a portion of the total usage measurement for the time period of interest is assigned to each of the two single units 104, 106 based on the difference in the total usage measurement between one of the start times and the stop times. This concept will be explained with reference to FIG. 4.

Figure 4:
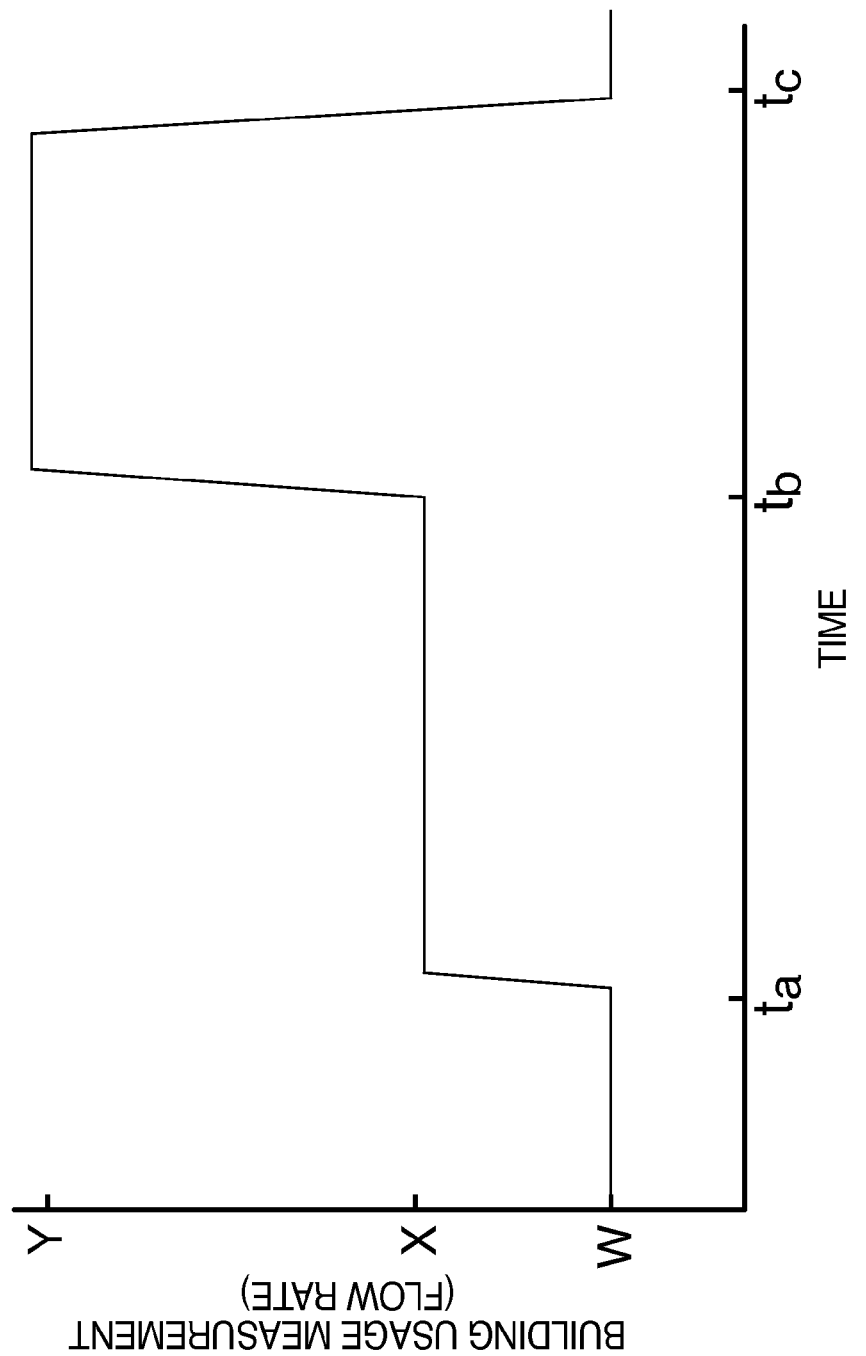
FIG. 4 is a graph of exemplary building usage measurement and monitoring data from non-invasive sensor units.

FIG. 4 shows an exemplary graph of building usage measurement data and monitoring data from non-invasive sensor units 160. The building usage measurement on this graph is represented by flow rate. The non-invasive sensor unit 160 on the unit feed pipe 130 of the first single unit 104 registers a water start time of $t_a$ and a subsequent stop time of $t_c$. Similarly, the non-invasive sensor unit 160 on the unit feed pipe 130 of the second single unit 106 registers a start time of $t_b$ and a subsequent stop time of $t_c$. Further the main feed pipe meter unit 150 registers a rise in flow rate from W to X at $t_a$, from X to Y at $t_b$, and from Y to W at $t_c$.

In this example, the total usage measurement will be adjusted for base water usage. Prior to time $t_a$ and after time $t_c$ the non-invasive sensor units 160 are not registering any flow through the unit feed pipes 130 of the single units 104, 106. Accordingly, the flow prior to $t_a$ and after $t_c$ is flow which is unattributable to the single units 104, 106 and therefore is flow from base water usage ("base water flow"). Although the base water flow may actually vary between time $t_a$ and time $t_c$, it may be assumed that the flow varies linearly. Therefore, because in this example prior to time $t_a$ and after time $t_c$ the base water flow is W, it may be assumed that the base water flow is constant at W throughout the time period of interest (from $t_a$ to $t_c$).

Persons skilled in the art will understand that the total usage measurement may be determined from this graph of building usage measurement by subtracting the base water flow (i.e. W) from each data point. If it is assumed that the pattern of water consumption for a given unit feed pipe 130 is that it rises from zero to a constant then back to zero again then the water consumption attributable to the first single unit 104 is approximately a flow rate of (X−W) for a time period of ($t_c$−$t_a$). Similarly, the water consumption of the second single unit 106 may be approximated by the difference in the total usage measurement at the start times $t_a$ and $t_b$ (i.e. a flow rate of (Y−X)) for a time period of ($t_c$−$t_b$).

Figure 5:
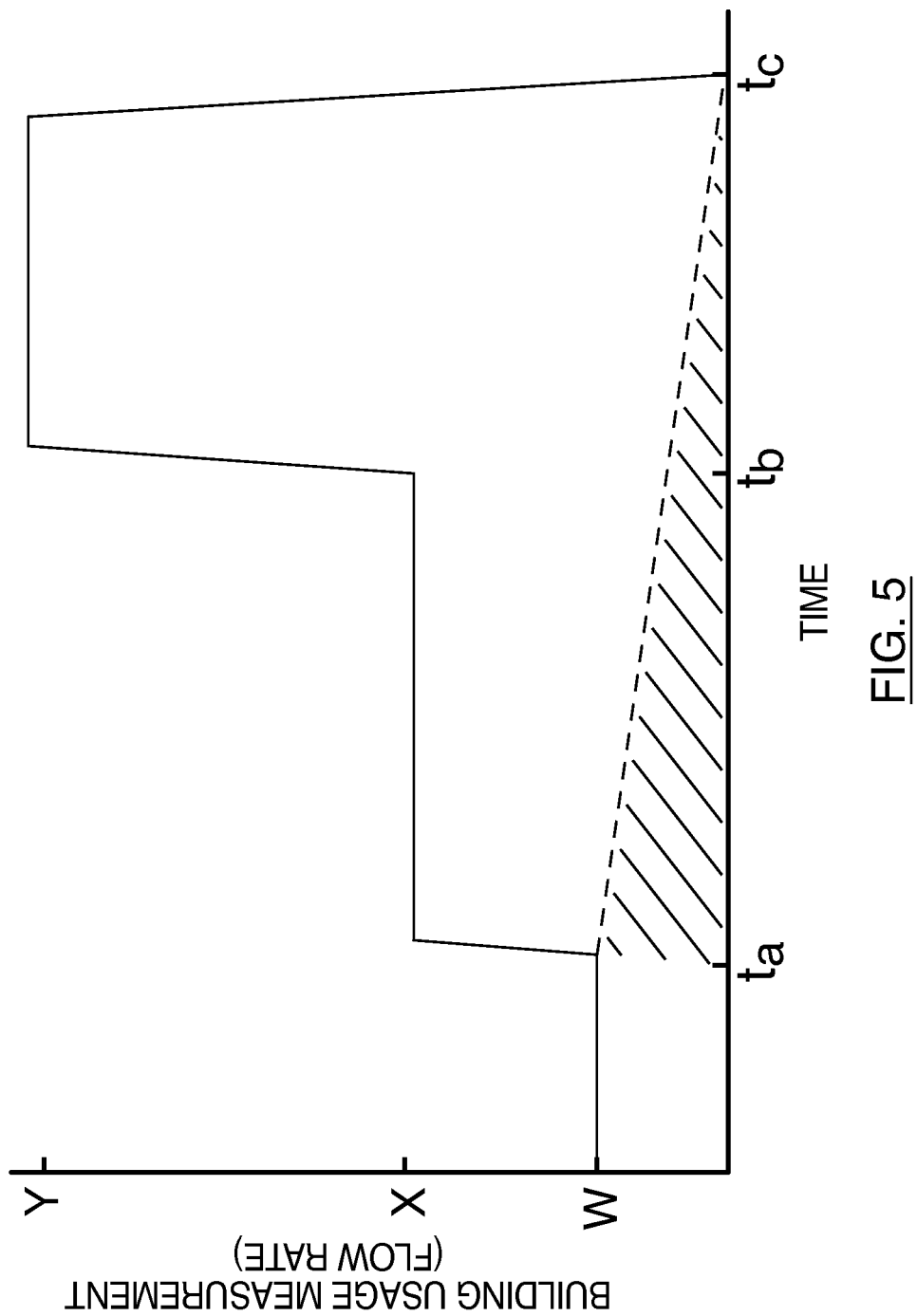
FIG. 5 is a graph of exemplary building usage measurement and monitoring data from non-invasive sensor units.

FIG. 5 shows a second exemplary graph of building usage measurement data and monitoring data from non-invasive sensor units 160. FIG. 5 presents the same data as FIG. 4 except that at time $t_c$ the main feed pipe meter unit 150 registers a water consumption of zero. In this example, prior to $t_a$ there is a base water flow of W and after $t_c$ there is a base water flow of zero. Therefore, using a linear approximation, the base water flow may be assumed to vary linearly from W to zero during the time period of interest (from $t_a$ to $t_c$). Therefore, the water consumption attributable to base water usage may be equal to the time integration of the base water flow over the time period of $t_a$ to $t_c$ (hatched). Accordingly, the water consumption that is attributable to the first single unit 104 is approximately a flow rate of (X−W) for a time period of ($t_c$−$t_a$) less the base water usage during the time period from $t_a$ to $t_c$. Similarly, the water consumption that is attributable to the second single unit 106 is approximately a flow rate of (Y−X) for a time period of ($t_c$−$t_b$) less the base water usage during the time period from $t_b$ to $t_c$.

Figure 6:
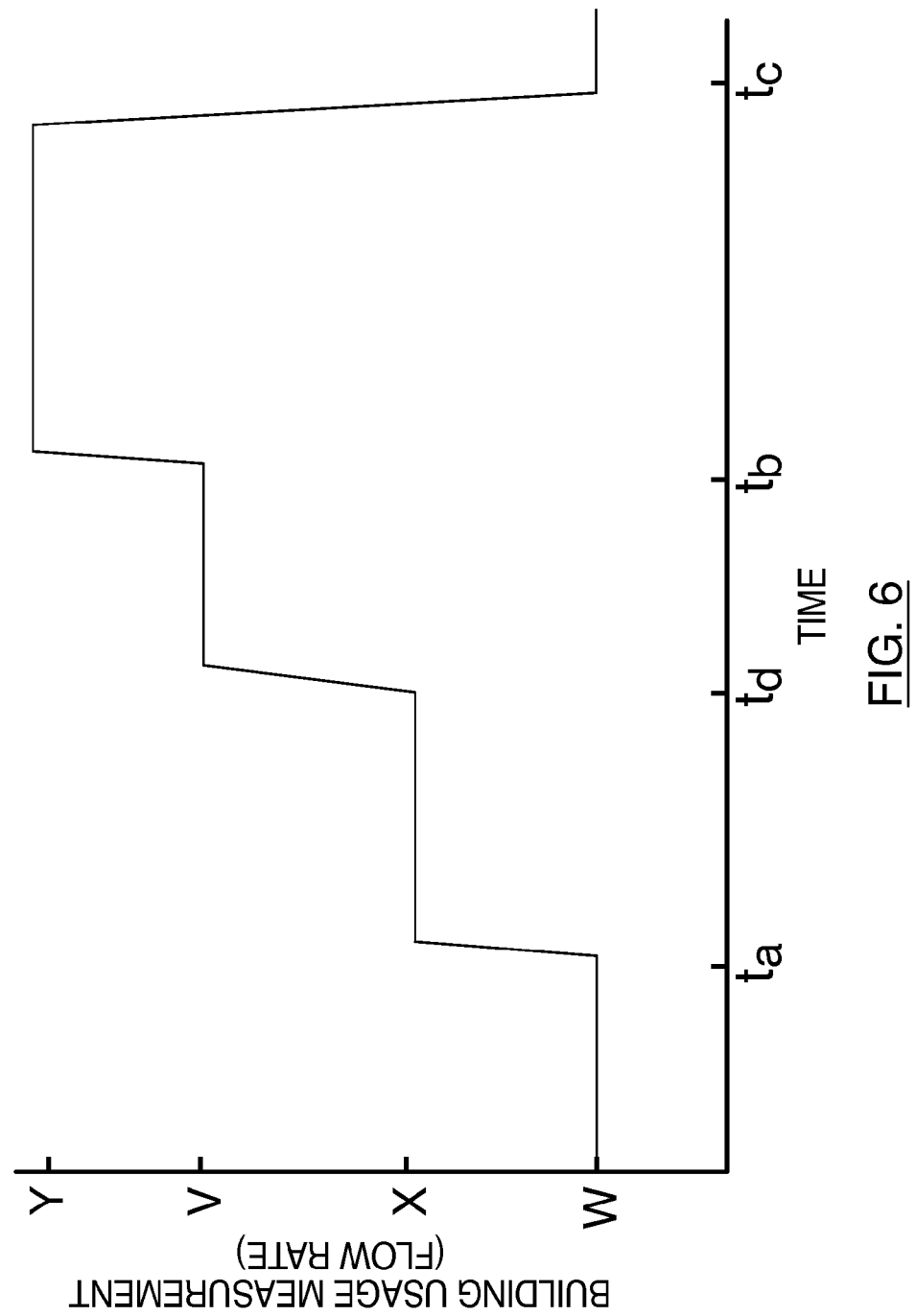
FIG. 6 is a graph of another exemplary building usage measurement and monitoring data from non-invasive sensor units.

FIG. 6 shows a third exemplary graph of building usage measurement data and monitoring data from non-invasive sensor units 160. FIG. 6 presents the same data as FIG. 4 except that the main feed pipe meter unit 150 registers an increase in flow rate from X to V at $t_d$. This exemplary graph illustrates a situation where there is a simultaneous stop time and the flow is changed at one unit after the start time. To determine in which single unit 104, 106 the change in flow through the unit feed pipe 130 occurred the non-invasive sensor unit 160 measures a change in flow at the unit feed pipe 130 which experiences the increase in flow. The single unit 104, 106 that experiences the flow increase would have that utility use attributed to them. Without this determination, the change in flow rate could be attributable to either single unit 104, 106. The same method can be used where there is a simultaneous start time and the main feed pipe meter unit 150 registers a decrease in flow rate to determine which single unit 104, 106 to attribute the use to.

It will be appreciated that although FIGS. 4, 5, and 6 show examples where the start times are different and the stop times are the same, it is contemplated that utility consumption may be apportioned to a plurality of single units 104, 106 with any variation of relative start and stop times. For example, the start and stop times may all be different or they may be all the same. As explained above, if the start times are all the same and the stop times are all the same the method proceeds to step 310.

At step 310, if the water flow start and stop times of the unit feed pipes 130 of each of the single units 104, 106 are identical then a portion of the total usage measurement is assigned to each of the single units 104, 106 based on other factors. It will be appreciated that any suitable factors may be considered to apportion the water consumption between the two single units 104, 106.

For example, a portion of the total usage measurement may be assigned to each of the single units 104, 106 based on historic consumption of the utility by each of the first and second single units 104, 106. In this example, if historically the first single unit 104 consumes twice as much water as the second single unit 106, then ⅔ of the total usage measurement may be assigned to the first single unit 104 and ⅓ of the total usage measurement may be assigned to the second single unit 106.

In another example, a portion of the total usage measurement may be assigned to each of the single units 104, 106 based on historic consumption rate of the utility by the unit feed pipes 130 of each of the single units 104, 106. In this example, if historically the water outlet 120 of the first single unit 104 consumes water twice as fast as the water outlet 120 of the second single unit 106, then ⅔ of the total usage measurement may be assigned to the first single unit 104 and ⅓ of the total usage measurement may be assigned to the second single unit 106. In still another example, an equal portion of the total usage measurement may be assigned to each of the first and second single units 104, 106.

While the method 300 has been described in reference to a multi-unit building 102 with two single units 104, 106 where each single unit 104, 106 only has as single unit feed pipe 130, it will be evident to a person of skill in the art that the method 300 can be extrapolated to encompass any number of units with any number of unit feed pipes.

For example, where the multi-unit building 102 has two single units 104, 106 and each single unit 104, 106 has both a cold water unit feed pipe 130 and a hot water unit feed pipe 140, the hot water consumption and the cold water consumption may be apportioned to each single unit 104, 106 separately. In this embodiment, the total usage measurement may comprise the multi-unit building's hot water consumption and cold water consumption determined by using both the main feed pipe meter unit 150 and a water feed pipe meter unit 155, as described above. Alternatively, the mixture of cold and hot water can be determined using the method as described earlier (measuring the relative flow of cold and hot water to determine the proportion of cold and hot water used).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for apportioning usage of a utility in a multi-unit building, the method comprising:
   (a) measuring total usage of the utility by the multi-unit building using a meter unit to produce a total usage measurement;
   (b) positioning at least one sensor unit in a single unit of the multi-unit building;
   (c) monitoring usage of the utility by the single unit using the at least one sensor unit without measuring a quantity of usage of the utility by the single unit to produce monitoring data;
   (d) receiving the total usage measurement and the monitoring data at a processor unit;
   (e) correlating the total usage measurement and the monitoring data using the processor unit to generate correlated data; and
   (f) apportioning the total usage measurement to the single unit using the processor unit based on the correlated data.

2. The method of claim 1 wherein monitoring usage of the utility by the single unit comprises:
   (i) determining a start time for usage of the utility; and
   (ii) determining a stop time for usage of the utility.

3. The method of claim 2, wherein determining the start and stop times comprises monitoring the sound in at least one of a unit feed pipe and a utility outlet.

4. The method of claim 2, wherein determining the start and stop times comprises monitoring the temperature of at least one of a unit feed pipe and a utility outlet.

5. The method of claim 2, further comprising:
   (i) positioning at least one sensor unit in each of a plurality of single units of the multi-unit building;
   (ii) monitoring usage of the utility by each of the plurality of single units using the sensor units to produce monitoring data; and
   (iii) apportioning the total usage measurement to the plurality of single units using the processor unit based on the correlated data.

6. The method of claim 1, wherein measuring the total usage of the utility by the multi-unit building comprises measuring one of flow and quantity of the utility through the main feed pipe.

7. The method of claim 1, wherein the method further comprises wirelessly transmitting the total usage measurement from the meter unit to the processor unit.

8. The method of claim 1, wherein the method further comprises wirelessly transmitting the monitoring data from the at least one sensor unit to the processor unit.

9. The method of claim 1, wherein the sensor unit is non-invasive.

10. A system for apportioning utility usage in a multi-unit building, the system comprising:
    (a) a meter unit mounted to a main feed pipe for measuring the usage of the utility by the multi-unit building to generate a total usage measurement, the main feed pipe supplying the utility to the multi-unit building;
    (b) at least one sensor unit positioned in a single unit of the multi-unit building for monitoring use of the utility by the single unit without measuring a quantity of use of the utility by the single unit to generate monitoring data;
    (c) a processor unit for:
       receiving the total usage measurement from the meter unit;
       receiving the monitoring data from the at least one sensor unit;
       correlating the total usage measurement and the monitoring data to generate correlated data; and
       apportioning the total usage measurement to the single unit based on the correlated data.

11. The system of claim 10 wherein the at least one sensor unit is configured to:
    (i) determine a start time for usage of the utility; and
    (ii) determine a stop time for usage of the utility.

12. The system of claim 11, wherein the at least one sensor unit comprises an acoustic sensor for determining the start and stop times based on sound detected in at least one of the unit feed pipe and the utility outlet.

13. The system of claim 11, wherein the at least one sensor unit comprises a temperature sensor for determining the start and stop times based on the temperature in at least one of one of the unit feed pipe and the utility outlet.

14. The system of claim 10, wherein the meter unit measures one of flow and quantity of the utility through the main feed pipe.

15. The system of claim 10, further comprising:
- at least one sensor unit positioned in each of a plurality of single units of the multi-unit building for monitoring usage of the utility by each single unit to generate monitoring data; and
- wherein the processor unit is further configured for apportioning the total usage measurement to the plurality of single units based on the correlated data.

16. The system of claim 10, wherein the meter unit comprises a wireless transmission unit for wirelessly transmitting the total usage measurement to the processor unit.

17. The system of claim 16, wherein the at least one sensor unit comprises a wireless transmission unit for wirelessly transmitting the monitoring data to the processor unit.

18. The system of claim 17, wherein the meter unit, the at least one sensor unit and the processor unit form a wireless mesh network.

19. The system of claim 10, wherein the sensor unit is non-invasive.

* * * * *